United States Patent [19]

Maruhashi et al.

[11] 4,393,106
[45] Jul. 12, 1983

[54] LAMINATED PLASTIC CONTAINER AND PROCESS FOR PREPARATION THEREOF

[75] Inventors: Yoshitsugu Maruhashi, Yokohama; Isao Tanikawa, Ayase; Sadao Hirata, Yokohama; Jinichi Yazaki, Tokyo; Kozaburo Sakano, Kawasaki, all of Japan

[73] Assignee: Toyo Seikan Kaisha Ltd., Tokyo, Japan

[21] Appl. No.: 315,952

[22] Filed: Oct. 28, 1981

[30] Foreign Application Priority Data

Oct. 31, 1980 [JP] Japan ............................. 55-152243
Oct. 31, 1980 [JP] Japan ............................. 55-152245

[51] Int. Cl.³ .................. B65D 23/00; B32B 31/00; B29D 9/04; B05D 1/36
[52] U.S. Cl. .................................. 428/35; 215/1 C; 156/229; 156/244.13; 427/412.3; 427/412.4; 427/412.5; 264/512; 264/514; 264/537; 264/540
[58] Field of Search ............. 215/1 C; 428/35; 264/512, 514, 515, 537, 540; 427/412.3, 412.4, 412.5; 156/229, 244.13, 244.14

[56] References Cited

U.S. PATENT DOCUMENTS

| | | | |
|---|---|---|---|
| 3,561,629 | 2/1971 | Turner | 215/1 C |
| 3,804,663 | 4/1974 | Clark | 428/336 |
| 3,988,500 | 10/1976 | Jahn | 427/412.3 |
| 4,079,850 | 3/1978 | Suzuki et al. | 215/1 C |
| 4,107,362 | 8/1978 | Valyi | 215/1 C |
| 4,327,052 | 4/1982 | Sauer | 264/512 |

Primary Examiner—William R. Dixon, Jr.
Attorney, Agent, or Firm—Sherman & Shalloway

[57] ABSTRACT

Disclosed is a laminated plastic container in the form of a bottle, the wall of which comprises a substrate formed of a melt-moldable plastic material, a coating layer formed on at least one surface of the substrate, said coating layer being composed of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers, said copolymer having an oxygen permeation coefficient of less than $9 \times 10^{-14}$ cc·cm/cm²·sec·cmHg as measured at a temperature of 20° C. and a relative humidity of 100% and a water vapor permeability coefficient of less than $3 \times 10^{-3}$ g·cm/m²·day as determined according to the method of JIS Z-0208, and a protecting surface layer of a film-forming synthetic resin other than a vinylidene chloride resin, which is formed contiguously to said coating layer.

This laminated plastic container is excellent in the barrier property to various gases such as oxygen, water vapor, nitrogen and carbon dioxide gas and other properties required for plastic containers. The humidity dependency of the oxygen barrier property is highly improved in this laminated plastic container.

16 Claims, 1 Drawing Figure

Fig. 1

LAMINATED PLASTIC CONTAINER AND PROCESS FOR PREPARATION THEREOF

BACKGROUND OF THE INVENTION (1) Field of the Invention

The present invention relates to a multi-layer plastic molded container. More particularly, the present invention relates to a multi-layer plastic molded container which is excellent in the barrier property to gases such as nitrogen, carbon dioxide gas, oxygen and steam, especially in the combination of the oxygen barrier property and moisture resistance, and in which the humidity dependency of the oxygen barrier property is prominently reduced and the properties of the barrier layer, such as shock resistance, scratch resistance, peel strength, weatherability, hot water resistance and content resistance are highly improved.

(2) Description of the Prior Art

Plastic bottles prepared by melt-extruding and hollow-molding (blow-molding) thermoplastic plastics such as polyolefins are used in various fields instead of glass bottles because the plastic bottles have a lighter weight and a better shock resistance than the glass bottles.

General-purpose plastics such as polyolefins are excellent in the moisture resistance and sanitary characteristics, but the oxygen permeability coefficient is relatively high and in bottles of these plastics, permeation of oxygen through bottle walls is not negligible. Accordingly, bottles of general-purpose plastics are not suitable as vessels for preserving foods for a long time or as vessels for cosmetics and the like where a high flavor-retaining property is required.

As bottles in which this defect is overcome, there have been developed and proposed plastic bottles having a wall structure excellent in the oxygen barrier property. Among melt-extrudable thermoplastic resins which are now available, a saponified ethylene/vinyl acetate copolymer (ethylene/vinyl alcohol copolymer) is most excellent in the oxygen barrier property. However, this saponified copolymer has inferior moisture resistance, that is, the steam barrier property, and in this saponified copolymer, the oxygen permeability coefficient tends to increase as the humidity increases. Accordingly, when this saponified copolymer is actually used for the formation of plastic bottles, it is necessary to adopt a troublesome molding method in which this saponified copolymer is sandwiched by moisture-resistant resins such as polyolefins and the resulting laminate is fed to the molding step to form a multi-layer laminate bottle. According to this method, however, the humidity dependency of the oxygen permeation coefficient of the saponified polymer is not completely eliminated, and increase in the oxygen permeation coefficient with increase in the humidity is especially prominent when an aqueous content is hot-filled in the above-mentioned laminate bottle or when the laminate bottle is subjected to retort sterilization.

We found that a copolymer comprising 99 to 70% by weight of vinylidene chloride and 1 to 30% by weight of at least one acrylic or methacrylic monomer and further including up to 100 parts by weight of other ethylenically unsaturated monomer per 100 parts by weight of the sum of the amounts of said two monomers (often called "vinylidene chloride copolymer" hereinafter) is a thermoplastic resin prominently excellent in the combination of the oxygen barrier property and the moisture resistance, as is seen from Table 1 given hereinafter, and the oxygen barrier property of this resin is not substantially changed according to the humidity of the measurement atmosphere, that is, the humidity dependency of the oxygen barrier properties is remarkably reduced. We have already proposed a bottle comprising this vinylidene chloride copolymer as a wall component and a process for the preparation thereof in our copending U.S. patent application Ser. No. 258,772.

The above-mentioned vinylidene chloride copolymer is still inadequate as the wall component of a plastic bottle because of the following defects.

(1) The melting temperature of the copolymer is very close to the thermal decomposition temperature thereof, and since thermal decomposition starts just after melting, melt extrusion molding of the copolymer is ordinarily difficult.

(2) The impact strength is low and especially low at low temperatures, and the bottle wall of this copolymer is readily broken when the bottle is dropped or is shaken and the barrier property is lost.

(3) Because of poor scratch resistance or weatherability, when the copolymer is used for coating a substrate bottle, the copolymer is readily deteriorated by shaking or outdoor exposure and peeled from the substrate bottle, resulting in loss of the barrier property.

(4) Whitening is caused when the copolymer is dipped in hot water. Accordingly, if hot water is filled in a plastic bottle having the inner surface coated with the copolymer, the transparency of the bottle is reduced or lost.

(5) Since the copolymer is soluble in an organic solvent such as tetrahydrofuran or cyclohexanone, a plastic bottle having the inner surface coated with the copolymer cannot be used for a content comprising such organic solvent as a base.

SUMMARY OF THE INVENTION

We found that when a laminate structure is prepared by forming a coating layer of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers on at least one of inner and outer surfaces of a plastic parison or plastic vessel prepared in advance by melt molding of a thermoplastic resin and also forming a protecting layer of a film-forming synthetic resin exclusive of a polyvinylidene chloride resin (hereinafter referred to as "film-forming resin") on the surface of the coating layer on the side opposite to said thermoplastic resin substrate (the plastic parison or plastic vessel). By such coating operation, even if the thickness of the coating layer is considerably small, the barrier property of the resulting plastic container to gases such as oxygen and carbon dioxide gas, especially the combination of the oxygen barrier property and the moisture resistance, is prominently improved and the humidity dependency of the oxygen barrier property is drastically reduced, and the resulting plastic container is prominently excellent in the content-preserving and flavor-retaining properties and is highly improved in such properties of the vinylidene chloride copolymer layer (coating layer) as the shock resistance, scratch resistance, peel strength, weatherability, hot water resistance and content resistance.

It is therefore a primary object of the present invention to provide a laminated plastic container which is excellent in the combination of the oxygen barrier property and the moisture resistance and in which the humidity dependency of the oxygen barrier property is remarkably reduced, and a process for the preparation of such laminated plastic container.

Another object of the present invention is to provide a laminated plastic container comprising a coating layer of a copolymer comprising a major amount of vinylidene chloride and a minor amount of an acrylic or methacrylic monomer as indispensable monomers, which is formed on a plastic vessel substrate, and further comprising a protecting layer of a film-forming thermoplastic resin for this coating layer, and a process for the preparation of such laminated plastic container.

Still another object of the present invention is to provide a plastic container comprising a plastic vessel substrate imparting a necessary form-retaining property and a necessary mechanical strength to the container, a coating layer imparting good oxygen barrier and steam barrier properties to the container and being excellent in the adhesion to the plastic vessel substrate, and a protecting layer eliminating the defects of the coating layer, such as poor mechanical strength, poor weatherability and poor hot water resistance, and a process for the preparation of such laminated plastic container.

In accordance with the fundamental aspect of the present invention, there is provided a laminated plastic container in the form of a bottle, the wall of which comprises a substrate formed of a melt-moldable plastic material, a coating layer formed on at least one surface of the substrate, said coating layer being composed of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers, said copolymer having an oxygen permeation coefficient of less than $9 \times 10^{-14}$ cc·cm/cm$^2$·sec·cmHg as measured at a temperature of 20° C. and a relative humidity of 100% and a water vapor permeability coefficient of less than $3 \times 10^{-3}$ g·cm/m$^2$·day as determined according to the method of JIS Z-0208, and a protecting surface layer of a film-forming synthetic resin other than a vinylidene chloride resin, which is formed contiguously to said coating layer.

DETAILED DESCRIPTION OF THE PREFERRED EMBODIMENTS

Figure 1:
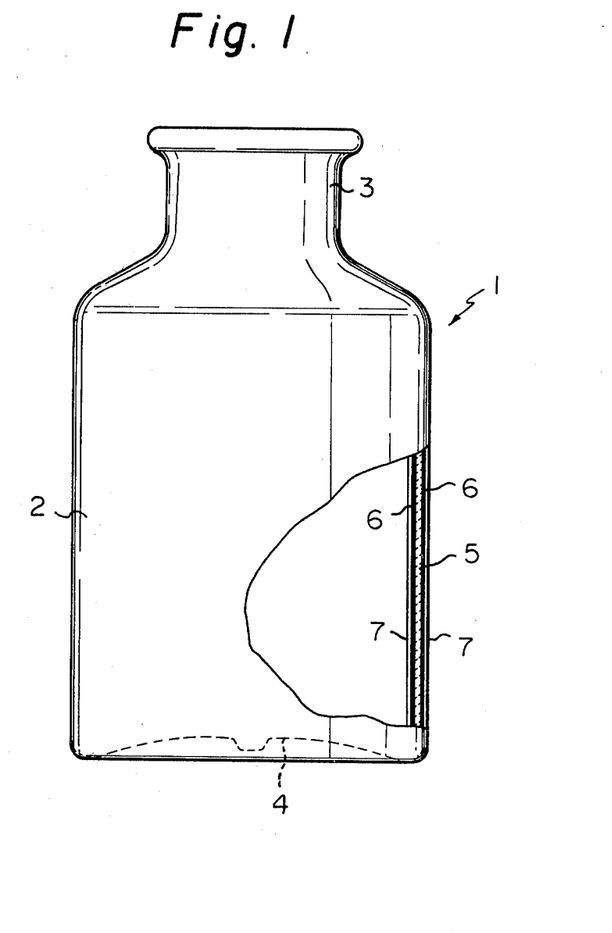
FIG. 1 is a partial sectional perspective view showing one embodiment of the laminated plastic container according to the present invention.

Referring to FIG. 1 illustrating an embodiment of the laminated plastic container of the present invention, bottle 1 comprises a peripheral wall 2 having a circular or ellipsoidal section, a mouth portion 3 connected integrally to the peripheral wall 2 and a bottom portion 4 connected to the lower end of the peripheral wall 2. All of these bottle walls comprise a plastic bottle substrate 5 formed from a melt-moldable thermoplastic resin by blow molding, injection molding or biaxially drawing blow molding, a coating layer 6 of a vinylidene chloride/acrylic or methacrylic monomer copolymer formed on the surface of the substrate 5 and a protecting layer 7 composed mainly of a film-forming synthetic resin. These coating and protecting layers 6 and 7 may be formed on both the surfaces of the bottle substrate 5 as shown in FIG. 1 or they may be formed only on the inner or outer surface of the bottle substrate 5.

The copolymer that is used for the coating layer in the present invention comprises as indispensable components 99 to 70% by weight, preferably 96 to 75% by weight, of vinylidene chloride and 1 to 30% by weight, preferably 4 to 25% by weight of at least one acrylic or methacrylic monomer, and as an optional component, other ethylenically unsaturated monomer in an amount of up to 100 parts by weight per 100 parts by weight of the total amount of said two indispensable monomers.

Acrylic acid, methacrylic acid or derivatives thereof may be used as the acrylic or methacrylic monomer in the present invention. As preferred monomers, there can be mentioned monomers represented by the following formula:

wherein $R_1$ stands for a hydrogen atom, a halogen atom or a methyl group, and X stands for a nitrile group (—C≡N) or in which Y stands for an amino group, a hydroxyl group, an alkyloxy group, a cycloalkyloxy group, an aminoalkyloxy group, a hydroxyalkyloxy group, an alkoxyalkyloxy group, a haloalkyloxy group, a glycidyl group, an aryloxy group of an aralkyloxy group.

More specifically, there can be mentioned acrylic acid, acrylonitrile, acrylamide, methyl acrylate, ethyl acrylate, methyl α-chloroacrylate, propyl acrylate, butyl acrylate, hexyl acrylate, octyl acrylate, cyclohexyl acrylate, glycidyl acrylate, 2-hydroxyethyl acrylate, acrylic monoglyceride, phenyl acrylate, methacrylic acid, methacrylonitrile, methacrylamide, methyl methacrylate, amyl methacrylate, glycidyl methacrylate, methacrylic monoglyceride, 2-hydroxypropyl methacrylate, β-methoxyethyl methacrylate, β-aminoethyl methacrylate and γ-N,N-diethylaminopropyl methacrylate.

These acrylic and methacrylic monomers may be used singly or in the form of a mixture of two or more of them. As the acrylic or methacrylic monomer that is especially suitable for attaining the objects of the present invention, there can be mentioned (i) a nitrile monomer such as acrylonitrile, methacrylonitrile or α-chloroacrylonitrile, (ii) an ester monomer such as methyl acrylate, ethyl acrylate, methyl methacrylate, 2-hydroxyethyl methacrylate, glycidyl acrylate, glycidyl methacrylate, acrylic monoglyceride, methacrylic monoglyceride, methoxyethyl acrylate or methoxyethylmethyl methacrylate, and (iii) a mixture of the monomers (i) and (ii).

As the ethylenically unsaturated monomer other than vinylidene chloride and the acrylic or methacrylic monomer, there can be mentioned, for example, vinyl aromatic monomers such as styrene and vinyl toluene, vinyl esters such as vinyl acetate and vinyl propionate, diolefins such as butadiene and isoprene, and methylvinyl ether, glycidylallyl ether, vinyl chloride, trichloroethylene, tetrachloroethylene, vinyl fluoride, difluoroethylene, trifluoroethylene, tetrafluoroethylene, maleic anhydride, fumaric acid, vinyl succinimide and vinyl pyrrolidone. These monomers may be used singly in the form of two or more of them.

Preferred copolymers are described below though copolymers that can be used in the present invention are not limited to those exemplified below.

Vinylidene chloride acrylonitrile copolymer, vinylidene chloride/acrylonitrile/methacrylonitrile copolymer, vinylidene chloride/methacrylonitrile copolymer, vinylidene chloride/acrylonitrile/glycidyl acrylate copolymer, vinylidene chloride/acrylonitrile/glycidyl methacrylate copolymer, vinylidene chloride/acrylonitrile/acrylic monoglyceride copolymer, vinylidene chloride/ethyl acrylate/glycidyl acrylate copolymer, vinylidene chloride/methyl methacrylate/styrene copolymer, vinylidene chloride/acrylonitrile/styrene copolymer, vinylidene chloride/acrylonitrile/trichloroethylene copolymer, vinylidene chloride/acrylonitride/vinyl chloride copolymer, vinylidene chloride/acrylonitrile/methacrylic monoglyceride/trichloroethylene copolymer, and vinylidene chloride/methoxyethyl methyl methacrylate/trichloroethylene copolymer.

From the viewpoint of the oxygen barrier property, it is important that the copolymer that is used in the present invention should comprise at least 70% by weight of vinylidene chloride units. In order to effect molding of a plastic bottle without degradation of the oxygen barrier property or humidity resistance, it is important that the copolymer should comprise at least 1% by weight of the acrylic or methacrylic monomer.

In order to improve the adhesion of the copolymer to various plastic bottle substrates, it is preferred that a monomer represented by the following formula:

wherein $R_1$ is as defined above and $R_2$ and $R_3$ each stand for a hydroxyl group and these two hydroxyl groups may be dehydrated to form an oxirane ring, is used in an amount of 0.5 to 15% by weight based on the whole monomers.

In order to further improve the moldability of the copolymer to a laminated plastic bottle, the copolymer that is used in the present invention may comprise up to 100 parts by weight of other ethylenically unsaturated monomer per 100 parts by weight of the total amount of vinylidene chloride and the acrylic or methacrylic monomer.

The copolymer that is used in the present invention can easily be prepared by emulsifying or suspending the constituent monomers in an aqueous medium by emulsifiers or dispersants and carrying out emulsion polymerization or suspension polymerization in the presence of a radical initiator. As the radical initiator, there may be used known peroxides, azo compounds or redox catalysts.

The molecular weight of the copolymer that is used in the present invention is not particularly critical, so far as it has a film-forming molecular weight. The copolymer that is used in the present invention is ordinarily difficult to mold by heating and melting, and therefore, the copolymer of the present invention is used for coating a plastic bottle substrate in the form of an organic solvent solution or an aqueous emulsion or latex according to methods described hereinafter.

The copolymer that is used in the present invention is prominently excellent in the combination of the oxygen barrier property and the moisture resistance, and is characterized in that the humidity dependency of the oxygen barrier property is very low. More specifically, the copolymer has an oxygen permeability coefficient of less than $9 \times 10^{-14}$ cc·cm/cm²·sec·cmH as measured at a temperature of 20° C. and a relative humidity of 100% and a water vapor permeability coefficient of less than $3 \times 10^{-3}$ g·cm/m²·day as determined according to the method of JIS Z-0208.

The oxygen permeability coefficients and water vapor permeability coefficients of resins customarily used for molding of bottles and the copolymers that are used in the present invention are shown in Table 1.

TABLE 1

| | Oxygen Barrier Property and Water Vapor Permeability of Various Plastic Films | | |
|---|---|---|---|
| | $O_2$ Barrier Property (20° C.) [cc·cm/cm²·sec·cmHg] | | Water Vapor Barrier Property (JIS Z-0208) |
| Plastics | (0% RH) | (100% RH) | (g·cm/m²·day) |
| Et/VA = 30/70 | $4.5 \times 10^{-14}$ | $1.7 \times 10^{-13}$ | $3.3 \times 10^{-1}$ |
| Nylon-6 | $8.0 \times 10^{-14}$ | $9.6 \times 10^{-13}$ | $4.1 \times 10^{-1}$ |
| AN/St = 80/20 | $4.7 \times 10^{-14}$ | $4.9 \times 10^{-14}$ | $1.1 \times 10^{-1}$ |
| PC | $5.2 \times 10^{-12}$ | $5.5 \times 10^{-12}$ | $1.4 \times 10^{-1}$ |
| PET | $4.1 \times 10^{-13}$ | $4.3 \times 10^{-13}$ | $9.0 \times 10^{-2}$ |
| PP | $8.7 \times 10^{-12}$ | $8.7 \times 10^{-12}$ | $3.0 \times 10^{-2}$ |
| HDPE | $4.7 \times 10^{-12}$ | $4.8 \times 10^{-12}$ | $1.5 \times 10^{-2}$ |
| LDPE | $1.9 \times 10^{-11}$ | $1.9 \times 10^{-11}$ | $5.4 \times 10^{-2}$ |
| PVC | $6.7 \times 10^{-13}$ | $6.7 \times 10^{-13}$ | $7.5 \times 10^{-2}$ |
| VdC/VC = 90/10 | $9.5 \times 10^{-14}$ | $9.5 \times 10^{-14}$ | $3.3 \times 10^{-3}$ |
| VdC/VC = 70/30 | $1.8 \times 10^{-13}$ | $1.9 \times 10^{-13}$ | $6.0 \times 10^{-3}$ |
| VdC/AN = 90/10 | $4.0 \times 10^{-14}$ | $4.0 \times 10^{-14}$ | $1.9 \times 10^{-3}$ |
| VdC/AN = 70/30 | $5.1 \times 10^{-14}$ | $5.1 \times 10^{-14}$ | $2.3 \times 10^{-3}$ |

TABLE 1-continued
Oxygen Barrier Property and Water Vapor Permeability of Various Plastic Films

| Plastics | $O_2$ Barrier Property (20° C.) [cc · cm/cm² · sec · cmHg] | | Water Vapor Barrier Property (JIS Z-0208) (g · cm/m² · day) |
|---|---|---|---|
| | (0% RH) | (100% RH) | |
| (VdC/AN):St = (70/30):10 | $8.4 \times 10^{-14}$ | $8.5 \times 10^{-14}$ | $2.9 \times 10^{-3}$ |

Note 1
Each sample is an undrawn sample.
Note 2
The abbreviations indicate the following polymers.
Et/VA: ethylene/vinyl alcohol copolymer
NYLON-6: nylon 6
AN/St: acrylonitrile/styrene copolymer
PC: polycarbonate
PET: polyethylene terephthalate
PP: isotactic polypropylene
HDPE: high density polyethylene
LDPE: low density polyethylene
PVC: polyvinyl chloride
VdC/VC: vinylidene chloride/vinyl chloride copolymer
VdC/AN: vinylidene chloride/acrylonitrile copolymer
(VdC/AN):St: (vinylidene chloride/acrylonitrile): styrene copolymer Incidentally, each of the numerical values in column "Plastics" in Table 1 shows the composition (copolymerization ratio) of the monomers.

From the data shown in Table 1, it will readily be understood that if the above-mentioned copolymer is used for coating of a plastic bottle according to the present invention, the combination of the oxygen barrier property and water vapor barrier property can be improved prominently over this combination in any of the conventional plastic bottles. Moreover, from the data shown in Table 1, it will readily be understood that in the copolymer that is used in the present invention, the oxygen permeability coefficient at a relative humidity of 100% is not substantially different from the oxygen permeability coefficient at a relative humidity of 0%, that is, the humidity dependency of the oxygen permeability coefficient is substantially zero. It is quite a surprising fact.

Furthermore, when the data of the vinylidene chloride/acrylonitrile copolymer shown in Table 1 are compared with, for example, the results obtained in Example 1 given hereinafter, it is found that both the oxygen permeation coefficient and water vapor permeation coefficient of the substrate (biaxially drawn polypropylene bottle)/coating layer (above copolymer)/protecting layer (methyl methacrylate/butadiene resin) laminate are much lower than those of the film composed solely of the above copolymer. The cause of this surprising fact is unknown, but it is considered that one of causes of relatively poor oxygen barrier property and water vapor barrier property is that fine cracks are formed on the film composed solely of the above copolymer because of the poor mechanical strength thereof.

Moreover, the carbon dioxide gas barrier property of this copolymer is prominently excellent, and a bottle molded by forming a coating layer of this copolymer and a protecting layer as described above can effectively be used as a carbonated drink vessel.

Optional plastic bottles formed from a melt-moldable thermoplastic resin by injection molding, blow molding, biaxially drawn blow molding or draw forming can be used as the plastic bottle substrate in the present invention. As the resin that is preferably used for formation of a bottle substrate, there can be mentioned, for example, low density polyethylene, medium density polyethylene, high density polyethylene, polypropylene, olefin type copolymers such as ethylene/propylene copolymers, ethylene/butene copolymers, ionomers, ethylene/vinyl acetate copolymers and ethylene/vinyl alcohol copolymers, polyesters such as polyethylene terephthalate, polybutylene terephthalate and polyethylene terephthalate/isophthalate, polyamides such as nylon 6, nylon 6,6 and nylon 6,10, polystyrene, styrene type copolymers such as styrene/butadiene block copolymers, styrene/acrylonitrile copolymers, styrene/butadiene/acrylonitrile copolymers (ABS resins), polyvinyl chloride, vinyl chloride type copolymers such as vinyl chloride/vinyl acetate copolymers, polymethyl methacrylate and acrylic copolymers such as methyl methacrylate/ethyl acrylate copolymers, and polycarbonate. These thermoplastic resins may be used singly or in the form of a blend of two or more of them. The plastic bottle substrate may have a single layer structure or a multi-layer laminate structure formed, for example, by simultaneous melt extrusion.

One of prominent advantages of the present invention is that even if an olefin type resin which is relatively cheap and excellent in the processability but is poor in the gas barrier property is used, a bottle excellent in the gas barrier property can be obtained.

Any of synthetic resins having a film-forming molecular weight, other than polyvinylidene chloride resins, can be used for formation of the protecting layer in the present invention. For example, synthetic rubbers, thermoplastic synthetic resins and thermosetting synthetic resins may be used. It is preferred that the protecting surface layer is composed of a resin having an Izod impact strength higher than that of the vinylidene chloride copolymer, especially an Izod impact strength of at least 1.1 Kg/cm² as measured at 5° C. according to the method of ASTM D-256. As preferred examples of the resin used for formation of the protecting layer, there can be mentioned synthetic rubbers such as styrene/butadiene rubber, acrylonitrile/butadiene rubber, chloroprene rubber, butyl rubber, stereospecific rubbers, e.g., cis-polybutadiene and cis-polyisoprene and polysulfide rubbers, e.g., Thiokol rubber, thermoplastic resins such as high density polyethylene, medium density polyethylene, high density polyethylene, polypropylene, poly-4-methylpentene-1, polybutene-1, polyisobutylene, olefin type copolymers, e.g., ethylene/propylene copolymers, ethylene/butene copolymers, ionomers, ethylene/vinyl acetate copolymers, ethylene/acrylic acid ester copolymers and ethylene/vinyl alcohol copolymers, polyesters, e.g., polyethylene terephthalate, polybutylene terephthalate and polyethylene terephthalate/isophthalate, polyamides, e.g., nylon 6, nylon 66 and nylon 610, polystyrene, styrene type copolymers, e.g., styrene/maleic anhydride copolymers, styrene/butadiene block copolymers, styrene/acrylonitrile copolymers and styrene/butadiene/acrylonitrile copolymers, polyvinyl chloride, vinyl chloride copolymers, e.g., vinyl chloride/vinyl acetate copolymers, polyvinyl acetate, vinyl acetate copolymers, e.g., vinyl acetate/acrylic acid ester copolymers, polymethyl methacrylate, acrylic copolymers, e.g., methyl methacrylate/ethyl acrylate copolymers, methacrylic acid ester/acrylic acid/styrene copolymers, acrylic acid ester/vinyl chloride copolymers, methacrylic acid ester/vinyl chloride copolymers, methacrylic acid ester/butadiene/styrene copolymers and methacrylic acid ester/acrylonitrile copolymers and polycarbonates, and thermosetting resins such as oleoresins, petroleum resins, rosin-, phenol- or styrene-modified phthalic acid alkyd resins, setting type cellulose resins, rosin-modified maleic acid resins, modified xylene resins, coumarone-indene resins, phenol-formaldehyde resins, setting type acrylic resins derived from various acrylic monomers, copolymer resins derived from acrylic resins and vinyl type unsaturated monomers, unsaturated polyester resins, epoxy resins, e.g., amine-setting epoxy resins, acid- or acid anhydride-setting epoxy resins and phenolic resin-setting epoxy resins, amino resins, e.g., urea-formaldehyde resins, melamine-formaldehyde resins and benzoguanamine-formaldehyde resins, etherified amino resins, triglycidyl isocyanurate resins, polyimide resins, polyamideimide resins and polyesterimide resins derived from pyromellitic acid, trimellitic acid or terephthalic acid, polyurethane resins, polyester urethane resins and polyether urethane resins derived from various aliphatic and aromatic polyisocyanate compounds and thermosetting silicone resins. These film-forming resins may be used in the form of mixtures of two or more of them. Furthermore, thermosetting resins having properties modified with a certain thermoplastic resin such as polyvinyl acetal, polyvinyl butyral, a ketone resin or a polyamide resin can be used.

In the present invention, it is indispensable that the thickness of the protecting layer should be 0.5 to 1000μ, preferably 3 to 700μ.

A bottle substrate used in the present invention can easily be obtained according to a blow molding method in which at least one member selected from the above-mentioned thermoplastic resins is melt-extruded in the form of a parison, supporting the extruded parison in a split mold and blowing a fluid into the parison. In order to obtain a bottle having improved shock resistance and transparency, there may be adopted a method in which a parison or preformed product is prepared by melt extrusion or injection molding, the parison or preformed product is mechanically drawn in the axial direction at a temperature lower than the melting point of the resin and simultaneously drawing the parison or preformed product in the circumferential direction by blowing a fluid into the parison or preformed product to obtain a biaxially oriented plastic bottle. The former blow molding method is effective for molding of polyethylene or polypropylene, and the latter biaxially drawing blow molding method is advantageously applied to molding of polyethylene terephthalate or polypropylene. Still further, a deeply-drawn wide-mouthed bottle formed by subjecting a preformed sheet or film to air-pressure forming or plug assist forming can advantageously be used in the present invention.

The thickness of the plastic bottle substrate can be changed in a broad range of from a relatively small thickness for a so-called squeeze vessel or light cup to a relatively large thickness for a rigid vessel. The base amount, that is, the weight per unit inner volume, is appropriately chosen from the range of 0.001 to 5 g/ml according to the intended use of the product bottle.

The laminated plastic bottle of the present invention is formed by coating at least one surface of the so-prepared plastic bottle substrate with an aqueous latex or organic solvent solution of the above-mentioned copolymer, drying the so formed coating, coating an aqueous latex or organic solvent solution of the film-forming resin on the surface of the coating of the vinylidene chloride copolymer and drying the so formed coating.

An aqueous latex of the vinylidene chloride copolymer having a solid concentration of 20 to 65% and a viscosity of 3 to 500 centipoises as measured at 20° C. is preferably used in the present invention.

A solution having a solid content of 5 to 60% in an organic solvent such as tetrahydrofuran, ethyl acetate, methylethyl ketone, cyclohexane, dimethylformamide, dimethylsulfoxide or dioxane.

Coating of the plastic bottle substrate with the above-mentioned copolymer latex or solution may be accomplished by adopting at least one of known coating methods such as dip coating, spray coating, brush coating, roller coating, electrostatic coating, centrifugal coating, cast coating and electrophoretic coating methods. The coating operation may be conducted only once or a multiple stage coating method may be adopted. If desired, the plastic bottle substrate may be subjected to a wetting property-improving preliminary treatment such as a pretreatment with an anchoring agent, a corona discharge treatment, a surface active agent coating treatment or a chemical etching treatment. Furthermore, in order to impart electric conductivity, the plastic bottle substrate may be subjected to a conducting treatment.

When the protecting layer is formed, in order to prevent thermal decomposition of the vinylidene chloride copolymer, it is preferred that an aqueous latex or organic solvent solution of the film-forming resin be coated on the surface of the copolymer layer (coating layer) without adopting the melt extrusion method.

An aqueous latex having a solid content of 20 to 60% by weight and a viscosity of 5 to 300 centipoises as measured at 20° C. is preferably used. An organic solvent having a solute concentration of 5 to 50% by weight is used. An appropriate solvent is selected according to the kind of the film-forming resin used. Organic solvents suitable for respective film-forming resins are described in, for example, "Solvent Pocket Book" compiled by Association of Organic Synthetic Chemistry and published by Ohm-Sha, Tokyo (1967) and "Chemistry of Synthetic Resins" written by Tadahiro Mitsuba and published by Gihodo, Tokyo (1963).

Coating of the surface of the vinylidene chloride copolymer coating layer with the above-mentioned film-forming resin latex or solution may be accomplished by adopting at least one of known coating methods such as dip coating, spray coating, brush coating, roller coating, electrostatic coating, centrifugal coating, cast coating and electrophoretic coating methods. The coating operation may be conducted only once or a multiple stage coating method may be adopted. If desired, the plastic bottle substrate may be subjected to a wetting property-improving preliminary treatment such as a pretreatment with an anchoring agent, a corona discharge treatment, a surface active agent coating treatment or a chemical etching treatment. Furthermore, in order to impart electric conductivity, the plastic bottle substrate may be subjected to a conducting treatment.

In the present invention, it is preferred that the coating layer of the above-mentioned copolymer and the protecting layer be formed on both the surfaces of the plastic bottle substrate. However, in order to shut gases contained in air, the coating layer and protecting layer may be formed on the outer surface alone, and in order to prevent escape of a gas or perfume from within the bottle, the coating layer and protecting layer may be formed on the inner surface alone.

The conditions adopted for drying the coated copolymer layer are changed according to the thickness of the coating layer, but ordinarily, a sufficient drying effect can be attained when drying is carried out at a temperature of 40° to 160° C. for about 2 seconds to about 60 minutes.

Drying of the protecting layer is carried out at 40° to 160° C. for 2 seconds to 60 minutes, though the drying conditions are changed according to the thermal decomposability of the copolymer layer, the amount coated, the kind of solvent used and the concentration of the coating liquid.

Hot air drying is most preferred for drying the coating and protecting layers. Of course, ultraviolet ray or radial ray drying may be adopted. In this case, the drying time can be shortened.

Since the same method can be adopted for formation of the coating layer and protecting layer, for example, the same coating apparatus and drying apparatus may be used while using two different store tanks for the resins. Accordingly, the coating process can be simplified. This is one of great characteristic advantages of the present invention.

The effect of shutting a gas or perfume can be attained sufficiently by the above-mentioned drying operation alone, but the effect is further enhanced if an aging treatment (heat treatment) is carried out at a temperature of 30° to 150° C. for 5 seconds to 7 days after the drying operation, if desired.

As pointed out hereinbefore, the vinylidene chloride copolymer that is used in the present invention is excellent in the combination of the oxygen barrier property and water vapor barrier property and the humidity dependency of the oxygen barrier property is very low. Accordingly, when the copolymer is formed on the plastic bottle substrate in the form of a very thin layer, excellent barrier properties to various gases can be obtained. More specifically, satisfactory results can ordinarily be obtained if the copolymer is formed in a layer having a thickness of 0.5 to 40$\mu$, especially 1 to 30$\mu$.

The thickness of the protecting layer for protecting the vinylidene chloride copolymer layer is preferably 0.5 to 1000$\mu$ and especially preferably 3 to 700$\mu$.

According to still another embodiment of the process for the preparation of plastic bottles of the present invention, a parison, preformed product or sheet of a thermoplastic resin to be formed into a plastic bottle substrate is coated with a latex or organic solvent solution of the above-mentioned copolymer and then dried to form a coating layer, a protecting layer of the film-forming resin is similarly formed and the laminated structure is subjected to drawing blow molding or deep draw forming to obtain a laminated plastic bottle. By this plastic processing, monoaxial or biaxial molecular orientation is given to the plastic bottle substrate and the rigidity, shock resistance and transparency are improved. The coating layer of the above-mentioned copolymer used in the present invention and the protecting layer can resist such processing and is advantageous in that the adhesion to the substrate is not lost by such processing.

Furthermore, the protecting surface layer may be formed by melt molding instead of coating with the aqueous latex or organic solvent solution.

According to this embodiment, one surface of a preformed product of a heat-moldable, orientable thermoplastic polymer is coated with a solution or emulsion of the vinylidene chloride copolymer, a heat-moldable, orientable thermoplastic polymer is injected or extruded on the coated surface of the preformed product to form a multilayer parison, and the so formed parison is drawn in the axial direction under such temperature conditions that molecular orientation is caused in at least one of the thermoplastic polymers on the inner surface and outer surface sides, while the parison is drawn in the circumferential direction by blowing, whereby a laminated plastic container of the present invention is obtained.

In forming the coating layer or protectng layer, known additives may be incorporated into coating and/or protecting layers. For example, in order to reinforce the plastic container, there may be incorporated a fibrous reinforcer such as glass fiber, aromatic polyamide fiber, carbon fiber, pulp or cotton linter, a powdery reinforcer such as carbon black or white carbon or a flaky reinforcer such as glass flake or aluminum flake in an amount of 2 to 150% by weight based on the copolymer. Furthermore, in order to obtain a bulking effect, heavy or soft calcium carbonate, gypsum, clay, magnesium sulfate, alumina powder, silica powder or magnesium carbonate may be incorporated in an amount of 5 to 150% by weight based on the copolymer.

Furthermore, one or more of other additives such as plasticizers, thermal stabilizers, antioxidants, ultraviolet absorbents, thickening agents, viscosity depressants, crosslinking agents, blocking preventing agents, lubricants, leveling agents and colorants may be added to at least one of the vinylidene chloride copolymer or film-forming resin according to known recipes.

Of course, these additives may be added to the plastic vessel substrate.

By virtue of these advantages, the laminated plastic container of the present invention is very valuable as a light-weight plastic container for preserving liquid foods, pasty foods, seasonings, drinks, medicines, cosmetics and agricultural chemicals.

The present invention will now be described in detail with reference to the following Examples which by no means limit the scope of the present invention.

The oxygen permeability and water vapor permeability of bottles and the oxygen permeability coefficient $PO_2$ and water vapor permeability coefficient $PH_2O$ of vinylidene chloride type resins were determined according to the following methods. Furthermore, the scratch resistance (pencil hardness) and hot water resistance (boiling test) were determined by the following method.

(1) Oxygen Permeation rate $QO_2$ at 20° C. and 0% RH:

A barrel wall of a container to be measured was cut into a predetermined size and a so obtained sheet-like sample was used for the measurement. A gas permeation tester manufactured by Toyo Tester Kogyo K.K. was used for the measurement. The sample was fixed between two chambers of this tester, and suction was effected in one chamber so that the pressure was reduced below $10^{-2}$ mmHg (low pressure side) while in the other chamber (high pressure side), the atmosphere was replaced by dehumidified oxygen gas so that the oxygen gas pressure was one atmosphere. The change of the pressure increase with the lapse time was read on a recorder and the oxygen gas permeation rate $QO_2$ was determined from the read values.

The measurement was carried out at 20° C. and the moisture was removed from the high pressure side chamber so that the relative humidity was 0%.

(2) Oxygen Permeation rate $QO_2$ at 20° C. and 100% RH:

A barrel wall of a bottle to be measured was cut into a sheel-like sample and the measurement was carried out by using an oxygen gas permeation tester (Mocon OX-Tran 100 manufactured by Modern Control Co.). More specifically, the oxygen gas permeation rate $QO_2$ was measured as 20° C. while maintaining a saturated water vapor pressure (100% RH) in either the oxygen chamber or the nitrogen chamber.

(3) Water Vapor Permeation Rate $QH_2O$:

The water vapor permeation rate $QH_2O$ was measured according to the method of JIS Z-0208 (at a temperature of 40° C. and a relative humidity of 0 and 90%). A barrel wall of a bottle to be measured was cut into a sheet-like sample having a predetermined size and this sample was used for the measurement.

(4) Oxygen Gas Permeability Coefficient $PO_2$ and Water Vapor Permeability Coefficient $PH_2O$ of Polyvinylidene Chloride Resins:

The values $QO_2$ and $QH_2O$ determined on coated plastic bottles according to the above-mentioned methods (1) and (3) are those of composite systems comprising a polyvinylidene chloride type resin coating and a plastic bottle substrate. The oxygen gas permeability coefficients $PO_2$ and water vapor permeability coefficients $PH_2O$ of the polyvinylidene chloride type resins at respective temperatures and relative humidities were calculated from the above values according to the following formulae:

$$PO_2 = \frac{(1.52 \times 10^{-15}) \times h}{\left(\frac{1}{QO_2} - \frac{1}{(QO_2)B}\right)} \ [cc \cdot cm/cm^2 \cdot sec \cdot cmHg]$$

and $$PH_2O = \frac{(1 \times 10^{-4}) \times h}{\frac{1}{QH_2O} - \frac{1}{(QH_2O)B}} \ [g \cdot cm/m^2 \cdot day]$$

wherein h stands for the thickness ($\mu$) of the coating of the polyvinylidene chloride resin, $QO_2$ stands for the oxygen permeation rate ($cc/m^2 \cdot day \cdot atm$) of the composite system, $(QO_2)B$ stands for the oxygen permeation rate ($cc/m \cdot day \cdot atm$) of the bottle substrate, $QH_2O$ stands for the water vapor permeation rate ($g/m^2 \cdot day$) of the composite system and $(QH_2O)B$ stands for the water vapor permeation rate ($g/m^2 \cdot day$) of the bottle substrate.

(5) Scratch Resistance (pencil hardness):

Under conditions of a temperature of 20° C. and a relative humidity of 40%, a weight of 0.5 Kg was placed on each of pencils having a hardness in the range of from 6B to 6H, and lines having a length of about 2 cm were drawn on the coated surface of a barrel portion cut out from a sample container. Then, pencil dust left on the surfaces was swept away, and the surface of the sample bottle was examined by a magnifying glass with 10 times magnification and the scratch resistance was evaluated based on the hardness of the pencil which left a scratch on the surface. Accordingly, the pencil hardness 6B indicates the lowest scratch resistance, and the scratch resistance is increased in the order of 5B, 4B, 3B, 2B, B, HB, H, 2H, 3H, 4H and 5H and the pencil hardness 6H indicates the highest scratch resistance.

(6) Hot Water Resistance (boiling test):

A square sample of about 2 cm × about 2 cm was cut out from the barrel wall of a laminated plastic container and was boiled in a thermostat hot water tank maintained at 95° C. for 30 minutes. Then, the sample was taken out from the tank and the whitening state was examined by a panel of two experts. Symbols shown in the following Examples have the following meanings:

O: both the two experts judged that whitening did not occur.

Δ: one expert judged that whitening did not occur but the other expert judged that whitening occurred.

X: both the two experts judged that whitening occurred.

EXAMPLE 1

An anchoring agent (EL-220/EL-200-AD supplied by Toyo Morton K.K.) was coated on the outer surface of a biaxially drawn cylindrical polypropylene bottle having an inner volume of 1000 cc, a weight of 30 g and an average thickness of 0.45 mm, and the coated bottle was subjected to heat treatment at 100° C. for 30 seconds. Then, an emulsion of a polyvinylidene chloride type resin having a composition shown in Table 2 (dispersion medium=water, emulsifier=Poval, solid concentration=45%) was coated on the bottle according to the dip coating method. The coated bottle was dried at 70° C. for 10 minutes in a perfect oven (explosion-proof type). The average coating thickness of the polyvinylidene chloride type resin was 11$\mu$.

For formation of a protecting layer, a latex of a methyl methacrylate/butadiene copolymer having an Izod impact strength (ASTM D-256) of 2.2 Kg/cm² at 5° C. (Butacon ML-507 supplied by ICI; solid concentration=46% by weight; viscosity=10 centipoises) was coated as the film-forming resin on the outer surface of the vinylidene chloride copolymer layer according to dip coating method, and the coated bottle was dried at 70° C. for 25 minutes in a perfect oven (explosion-proof type). The average thickness of the protecting layer was 5$\mu$.

The oxygen permeability coefficients (hereinafter referred to as "$PO_2$") and water vapor permeability coefficients (hereinafter referred to as "$PH_2O$") of the so obtained four biaxially drawn polypropylene bottles having a coating layer of the poly(vinylidene chloride/acrylonitrile) resin and a protecting layer of the methyl methacrylate/butadine (MMA/BUT) resin (bottles Ac, Bc, Cc and Dc), four comparative biaxially drawn polypropylene bottles free of the protecting layer (bottles Am, Bm, Cm and Dm) and the starting substrate bottle (uncoated bottle) were determined according to the methods described hereinbefore. Furthermore, the scratch resistance and hot water resistance were determined according to the methods described hereinbefore.

The obtained results are shown in Table 2. From the results shown in Table 2, it is seen that the $PO_2$ and $PH_2O$ values of the bottles coated with the vinylidene chloride copolymer resin were much smaller than those of the uncoated bottle, and that if the content of vinylidene chloride (VdC) is at least 70% by weight, the $PH_2O$ value is reduced and the barrier property is enhanced.

From the results shown in Table 2, it will also be understood that the $PO_2$ and $PH_2O$ values of the laminated plastic bottles having the protecting layer are smaller than those of the laminated plastic bottles free of the protecting layer and that the scratch resistance and hot water resistance are prominently improved by the protecting layer.

Then, the bottles Ec and Em were aged (heat-treated) in a thermostat chamber maintained at 48° C. for 36 hours.

The $PO_2$ and $PH_2O$ values, scratch resistance (pencil hardness) and hot water resistance (boiling test) of the so obtained bottles Ec and Em and the uncoated starting bottle HDPE were determined to obtain the results shown in Table 3.

EXAMPLE 3

The inner and outer surfaces of a polyvinyl chloride cylindrical bottle having an inner volume of 1000 cc, a weight of 27 g and an average thickness of 0.35 mm were coated with a latex of a polyvinylidene chloride type resin comprising 70% by weight of vinylidene chloride, 10% by weight of methyl acrylate and 20% by weight of glycidyl methacrylate (dispersion medium=water, emulsifier=sodium lignosulfonate, solid concen-

TABLE 2

| Sample Mark | Copolymerization Ratio (% by weight) | | Protecting Layer[2] | $PO_2[cc \cdot cm/cm^2 \cdot sec \cdot cmHg]$ | | $PH_2O[gcm/m^2 \cdot day]$ (JIS Z-0208) | Scratch Resistance (pencil hardness) | Hot Water Resistance (boiling test) |
|---|---|---|---|---|---|---|---|---|
| | Vinylidene chloride | Acrylonitrile | | 20° C., 0% RH | 20° C., 100% RH | | | |
| Ac | 99 | 1 | MMA/BUT | $0.77 \times 10^{-14}$ | $0.79 \times 10^{-14}$ | $0.34 \times 10^{-3}$ | H | O |
| Bc | 90 | 10 | MMA/BUT | $1.8 \times 10^{-14}$ | $1.8 \times 10^{-14}$ | $0.90 \times 10^{-3}$ | H | O |
| Cc | 70 | 30 | MMA/BUT | $2.3 \times 10^{-14}$ | $2.3 \times 10^{-14}$ | $1.0 \times 10^{-3}$ | H | O |
| Dc | 60 | 40 | MMA/BUT | $4.2 \times 10^{-14}$ | $4.4 \times 10^{-14}$ | $5.2 \times 10^{-3}$ | H | O |
| Am | 99 | 1 | — | $1.5 \times 10^{-14}$ | $1.6 \times 10^{-14}$ | $0.70 \times 10^{-3}$ | 6B | Δ |
| Bm | 90 | 10 | — | $3.9 \times 10^{-14}$ | $3.9 \times 10^{-14}$ | $1.6 \times 10^{-3}$ | 6B | X |
| Cm | 70 | 30 | — | $5.0 \times 10^{-14}$ | $5.0 \times 10^{-14}$ | $2.1 \times 10^{-3}$ | 6B | X |
| Dm | 60 | 40 | — | $6.2 \times 10^{-14}$ | $6.3 \times 10^{-14}$ | $9.1 \times 10^{-3}$ | 5B | X |
| uncoated[1] | — | — | — | $4.5 \times 10^{-12}$ | $4.6 \times 10^{-12}$ | $1.9 \times 10^{-2}$ | 5B | O |

Note
[1] sample cut out from the biaxially drawn polypropylene bottle not coated with the vinylidene chloride copolymer.
[2] MMA/BUT stands for the methyl methacrylate/butadiene copolymer (5μ in thickness)

EXAMPLE 2

An anchoring agent (EL-220/EL-200-AD supplied by Toyo Morton K.K.) was coated on the inner surface of a high density polyethylene bottle (ellipsoidal) having an inner volume of 500 cc, a weight of 17 g and an average thickness of 0.50 mm by a dip coating method, and the coated bottle was subjected to heat treatment at 80° C. for 5 minutes. Then, a solution of a polyvinylidene chloride resin comprising 90% by weight of vinylidene chloride (VdC), 5% by weight of acrylonitrile and 5% by weight of methacrylonitrile (MAN) (Solvent=tetrahydrofuran, solid concentration=20%) was coated on the bottle according to the dip coating method. The coated bottle was dried at 70° C. for 15 minutes in a perfect oven (explosion-proof type). The average coating thickness of the polyvinylidene chloride type resin was 5μ.

For formation of a protecting layer, a solution of atactic polystyrene having an Izod impact strength (ASTM D-256) of 1.1 Kg/cm² at 5° C. (Styron 666 supplied by Asahi-Dow; solid concentration=48% by weight; solvent=benzene) was coated as the film-forming resin on the inner surface of the vinylidene chloride copolymer layer according to the dip coating method, and the coated bottle was dried at 80° C. for 5 minutes in a perfect oven (explosion-proof type). The average thickness of the protecting layer was 15μ. The so obtained bottle is designated as "bottle Ec". The comparative bottle free of the protecting layer is designated as "bottle Em" and the starting uncoated bottle is designated as "bottle HDPE."

tration=61%) according to the dip coating method. The coated bottle was dried in an air-circulated oven at 55° C. for 60 minutes. The average thickness of the polyvinylidene chloride type resin coatings formed on the inner and outer surfaces of the polyvinyl chloride bottle was 25μ.

For formation of a protecting layer, a latex of a polyvinyl chloride having an Izod impact strength (ASTM D-256) of 2.3 Kg/cm² at 5° C. (Geon 576 supplied by Goodrich Chemical; solid concentration=57.5% by weight; viscosity=47 centipoises) was coated as the film-forming resin on the outer and inner surfaces of the vinylidene chloride copolymer layers according to the dip coating method, and the coated bottle was dried at 50° C. for 60 minutes in a perfect oven (explosion-proof type). The average thickness of each protecting layer was 460μ. This coated bottle having the protecting layer is designated as "bottle Fc". The comparative bottle free of the protecting layer is designated as "bottle Fm" and the starting uncoated bottle is designated as "bottle PVC".

Then, the bottles Fc and Fm were aged (heat-treated) in a thermostat chamber maintained at 48° C. for 24 hours.

The $PO_2$ and $PH_2O$ values, scratch resistance (pencil hardness) and hot water resistance (boiling test) of the so obtained bottles Fc and Fm and the uncoated starting bottle PVC were determined to obtain the results shown in Table 3.

EXAMPLE 4

The outer surface of a cylindrical polycarbonate bottle having an inner volume of 400 cc, a weight of 12 g and an average thickness of 0.30 mm was coated with an anchoring agent (EL-220/EL-200-AD supplied by Toyo Morton Co.) according to the dip coating method. Then, the bottle was dried at 70° C. for 15 minutes and spray-coated with a latex of a polyvinylidene type resin comprising 96% by weight of vinylidene chloride, 2% by weight of methyl acrylate and 2% by weight of glycidyl methacrylate (dispersion medium=water, emulsifier=rosin soap, solid concentration=37%). The coated bottle was dried at 80° C. for 2 minutes in an air-circulated oven. The average thickness of the polyvinylidene chloride resin coating formed on the outer surface of the polycarbonate bottle was 1.7μ.

For formation of a protecting layer, a solution of an epoxy resin having an Izod impact strength (ASTM D-256) of 100 Kg/cm$^2$ at 5° C. (Rigolac MH-400-60 supplied by Showa Kobunshi) in a mixed solvent of toluene, butyl acetate, butanol, ethyl acetate, ethanol and triol at a solid concentration 25% by weight was spray-coated as the film-forming resin on the outer surface of the vinylidene chloride copolymer layer, and the coated bottle was dried at 145° C. for 10 seconds in a perfect oven (explosion-proof type). The average thickness of the protecting layer was 15μ. This bottle having the protecting layer is designated as "bottle Gc". The comparative bottle free of the protecting layer is designated as "bottle Gm" and the starting uncoated bottle is designated as "bottle PC".

Then, the bottles Gc and Gm were aged (heat-treated) in a thermostat chamber maintained at 48° C. for 24 hours.

The PO$_2$ and PH$_2$O values, scratch resistance (pencil hardness) and hot water resistance (boiling test) of the so obtained bottles Gc and Gm and the uncoated starting bottle PC were determined to obtain the results shown in Table 3.

EXAMPLE 5

The outer surface of a cylindrical polymethyl methacrylate bottle having an inner volume of 200 cc, a weight of 18 g and an average thickness of 0.55 mm was brush-coated with a latex of a polyvinylidene chloride type resin comprising 86% by weight of vinylidene chloride, 5% by weight of acrylonitrile, 3% by weight of methyl acrylate and 6% by weight of glycidyl methacrylate (dispersion medium=water, emulsifier=Poval, solid concentration=51%). The coated bottle was dried at 90° C. for 1 minute in an air-circulated oven. The average thickness of the polyvinylidene chloride type resin coating formed on the polymethyl methacrylate bottle was 15μ.

For formation of a protecting layer, a latex of an acrylic acid type copolymer having an Izod impact strength (ASTM D-256) of 2.5 Kg/cm$^2$ at 5° C. (Hycar 4501 supplied by Goodrich Chemical; solid concentration=50% by weight; viscosity=17 centipoises) was coated as the film-forming resin on the outer surface of the vinylidene chloride copolymer layer, and the coated bottle was dried at 90° C. for 10 minutes in a perfect oven (explosion-proof type). The average thickness of the protecting layer was 75μ. This bottle having the protecting layer is designated as "bottle Hc". The comparative bottle free of the protecting layer is designated as "bottle Hm" and the starting uncoated bottle is designated as "bottle PMMA".

Then, the bottles Hc and Hm were aged (heat-treated) in a thermostat chamber maintained at 61° C. for 6 hours.

The PO$_2$ and PH$_2$O values, scratch resistance (pencil hardness) and hot water resistance (boiling test) of the so obtained bottles Hc and Hm and the uncoated starting bottle PMMA were determined to obtain the results shown in Table 3.

EXAMPLE 6

The inner and outer surfaces of a cylindrical acrylonitrile/styrene/butadiene copolymer bottle having an inner volume of 200 cc, a weight of 12 g and an average thickness of 0.50 mm were coated with a latex of a polyvinylidene chloride type resin comprising 80% by weight of vinylidene chloride, 10% by weight of methyl acrylate and 10% by weight of acrylic monoglyceride and including 50 parts by weight of vinyl chloride per 100 parts by weight of the foregoing monomers (dispersion medium=water, emulsifier=gelatin, solid concentration=30%) according to the dip coating method. The coated bottle was dried at 40° C. for 60 minutes in an air-circulated oven. The average thickness of the polyvinylidene chloride type resin coatings formed on the inner and outer surfaces of the acrylonitrile/styrene/butadiene copolymer bottle was 2.8μ.

For formation of a protecting layer, a latex of polyvinyl chloride having an Izod impact strength (ASTM D-256) of 2.1 Kg/cm$^2$ at 5° C. (Geon 151 supplied by Goodrich Chemical; solid concentration=55% by weight; viscosity=28 centipoises) was dip-coated as the film-forming resin on the outer and inner surfaces of the vinylidene chloride copolymer layers, and the coated bottle was dried at 45° C. for 60 minutes in a perfect oven (explosion-proof type). The average thickness of the protecting layer was 170μ. This bottle having protecting layers is designated as "bottle Jc". The comparative bottle free of the protecting layer is designated as "bottle Jm" and the starting uncoated bottle is designated as "bottle ABS".

Then, the bottles Jc and Jm were aged (heat-treated) in a thermostat chamber maintained at 30° C. for 7 days.

The PO$_2$ and PH$_2$O values, scratch resistance (pencil hardness) and hot water resistance (boiling test) of the so obtained bottles Jc and Jm and the uncoated starting bottle ABS were determined to obtain the results shown in Table 3.

EXAMPLE 7

An anchoring agent (EL-220/EL-200-AD supplied by Toyo Morton K.K.) was spray-coated on the outer surface of atactic polystyrene bottle having an inner volume of 200 cc, a weight of 23 g and an average thickness of 0.85 mm, and the coated bottle was subjected to heat treatment at 80° C. for 10 minutes. Then, the bottle was coated with a latex of a polyvinylidene chloride type resin comprising 75% by weight of vinylidene chloride, 20% by weight of methoxyl acrylate and 5% by weight of acrylic acid (dispersion medium=water, emulsifier=Poval, solid concentration=50%) according to the spray-brush coating method. The coated bottle was then dried at 110° C. for 30 seconds in an air-circulated oven. The average thickness of the polyvinylidene chloride type resin coating formed on the outer surface of the atactic polystyrene bottle was 15μ.

For formation of a protecting layer, a latex of a vinyl chloride/acrylic acid ester copolymer having an Izod impact strength (ASTM D-256) of 6.2 Kg/cm$^2$ at 5° C. (Test Product 351 supplied by Japanese Geon; solid concentration=36% by weight; viscosity=55 centipoises) was brush-coated as the film-forming resin on the outer surface of the vinylidene chloride copolymer layer, and the coated bottle was dried at 150° C. for 1 minute in a perfect oven (explosion-prroof type). The average thickness of the protecting layer was 60μ. The bottle having the coating layer is designated as "bottle Lc". The comparative bottle free of the protecting layer is designated as "bottle Lm" and the starting uncoated bottle is designated as "bottle PS".

Then, the bottles Lc and Lm were aged (heat-treated) in a thermostat chamber maintained at 60° C. for 24 hours.

The PO$_2$ and PH$_2$O values, scratch resistance (pencil hardness) and hot water resistance (boiling test) of the so obtained bottles Lc and Lm and the uncoated starting bottle PS were determined to obtain the results shown in Table 3.

EXAMPLE 8

The inner surface of a biaxially drawn polyethylene terephthalate cylindrical bottle having an inner volume of 1000 cc, a weight of 45 g and an average thickness of 0.54 mm was coated with a latex of a polyvinylidene chloride type resin comprising 83% by weight of vinylidene chloride, 14% by weight of methoxyethylmethyl methacrylate and 3% by weight of methacrylic acid and including 40 parts by weight of trichloroethylene per 100 parts by weight of the foregoing monomers (dispersion medium=water, emulsifier=Poval, solid concentration=47%) according to the dip coating method. The coated bottle was then dried at 70° C. for 10 minutes in an air-circulated oven. The average thickness of the polyvinylidene chloride type resin coating formed on the inner surface of the biaxially drawn polyethylene terephthalate bottle was 10μ.

For formation of a protecting layer, a latex of a vinyl chloride/vinyl acetate copolymer having an Izod impact strength (ASTM D-256) of 7.7 Kg/cm$^2$ at 5° C. (2023 ST supplied by Toyo Ink; solid concentration=17% by weight; viscosity=22 centipoises) was dip-coated as the film-forming resin on the inner surface of the vinylidene chloride copolymer layer, and the coated bottle was dried at 100° C. for 5 minutes in a perfect oven (explosion-proof type). The average thickness of the protecting layer was 10μ. This bottle having the coating layer is designated as "bottle Nc". The comparative bottle free of the protecting layer is designated as "bottle Nm" and the starting uncoated bottle is designated as "10 PET".

Then, the bottles Nc and Nm were aged (heat-treated) in a thermostat chamber maintained at 48° C. for 48 hours.

The PO$_2$ and PH$_2$O values, scratch resistance (pencil hardness) and hot water resistance (boiling test) of the so obtained bottles Nc and Nm and the uncoated starting bottle 10 PET were determined to obtain the results shown in Table 3.

EXAMPLE 9

The inner surface of an amorphous polyethylene terephthalate preform (bottomed parison) having an outer surface area of 130 cm$^2$, a weight of 62.5 g and an average thickness of 3.60 mm was coated with the polyvinylidene chloride type resin latex described in Example 8 according to the dip coating method so that the amount of the coating was 0.22 g as solids. Then, the coated preform was heated at 100° C. for 20 seconds and biaxially drawn and blow-molded by using a known biaxially drawing blow molding machine to obtain a biaxially drawn polyethylene terephthalate bottle having an inner volume of 2000 cc and an average total thickness of about 0.50 mm, which had the inner surface coated with the polyvinylidene chloride type resin. The average coating thickness was 1.4μ.

For formation of a protecting layer, a latex of an ionomer having an Izod impact strength (ASTM D-256) of 14.2 Kg/cm$^2$ at 5° C. (Corporene Latex L4000 supplied by Asahi-Dow; solid concentration=40% by weight; viscosity=200 centipoises) was dip-coated as the film-forming resin on the inner surface of the vinylidene chloride copolymer layer, and the coated bottle was dried at 100° C. for 5 minutes in a perfect oven (explosion-proof type). The average thickness of the protecting layer was 650μ. This bottle having the coating layer is designated as "bottle Pc". The comparative bottle free of the protecting layer is designated as "bottle Pm" and the starting uncoated bottle is designated as "20 PET".

Then, the bottles Pc and Pm were aged (heat-treated) in a thermostat chamber maintained at 48° C. for 48 hours.

The PO$_2$ and PH$_2$O values, scratch resistance (pencil hardness) and hot water resistance (boiling test) of the so obtained bottles Pc and Pm and the uncoated starting bottle 20 PET were determined to obtain the results shown in Table 3.

EXAMPLE 10

The outer surface of an amorphous polyethylene terephthalate preform (bottomed parison) having an outer surface area of 130 cm$^2$, a weight of 62.5 g and an average thickness of 3.60 mm was coated with the polyvinylidene chloride type resin latex described in Example 8 according to the dip coating method so that the amount of the coating was 0.96 g as solids. The coated preform was dried at 70° C. for 5 minutes in an air-circulated oven.

For formation of a protecting layer, a latex of an acrylonitrile/butadiene rubber having an Izod impact strength (ASTM D-256) of 9.8 Kg/cm$^2$ at 5° C. (Hycar 1552 supplied by Japanese Geon; solid concentration=52% by weight; viscosity=33 centipoises) was coated as the film-forming resin on the outer surface of the vinylidene chloride copolymer layer according to the dip coating method in an amount of 1.3 g as solids, and the coated bottle was dried at 70° C. for 10 minutes in a perfect oven (explosion-proof type). The coated preform was heated at 100° C. for 20 seconds and biaxially drawn and blow-molded by using a known biaxially drawing blow-molding machine to obtain a laminated polyethylene terephthalate bottle having an inner volume of 2000 cc and an average total thickness of about 0.50 mm and having a substrate/coating layer/protecting layer structure. The average thickness of the coating was 6.1μ and the average thickness of the protecting layer was 17μ. The so-obtained bottle is designated as "bottle Rc".

The comparative bottle free of the protecting layer, having a substrate/coating layer (6.1μ in thickness) structure, is designated as "bottle Rm" and the starting uncoated bottle is designated as "bottle 20 PET".

Then, the bottles Rc and Rm were aged (heat-treated) in a thermostat chamber maintained at 48° C. for 48 hours.

The $PO_2$ and $PH_2O$ values, scratch resistance (pencil hardness) and hot water resistance (boiling test) of the so obtained bottles Rc and Rm and the uncoated starting bottle 20 PET were determined to obtain the results shown in Table 3.

Then, the bottles Yc and Ym were aged (heat-treated) in a thermostat chamber maintained at 48° C. for 24 hours.

The $PO_2$ and $PH_2O$ values, scratch resistance (pencil hardness) and hot water resistance (boiling test) of discs cut from the bottoms of the so obtained cups Yc and Ym and the uncoated cup PP-C were determined to obtain the results shown in Table 4.

TABLE 3

| Example No. | Mark of Bottle | Protecting Layer | $PO_2$[cc·cm/cm²·sec·cmHg] 20° C., 0% RH | $PO_2$[cc·cm/cm²·sec·cmHg] 20° C., 100% RH | $PH_2O$[g·cm/m²·day] (JIS Z-0208) | Scratch Resistance (pencil hardness) | Hot Water Resistance (boiling test) |
|---|---|---|---|---|---|---|---|
| 2 | Ec | polystyrene | $0.78 \times 10^{-14}$ | $0.79 \times 10^{-14}$ | $0.59 \times 10^{-3}$ | HB | — |
|   | Em |  | $1.5 \times 10^{-14}$ | $1.5 \times 10^{-14}$ | $1.2 \times 10^{-3}$ | 6B | — |
|   | HDPE |  | $4.7 \times 10^{-12}$ | $4.8 \times 10^{-12}$ | $1.5 \times 10^{-2}$ | 3B | — |
| 3 | Fc | polyvinyl | $1.2 \times 10^{-14}$ | $1.2 \times 10^{-14}$ | $0.93 \times 10^{-3}$ | 2H | O |
|   | Fm | chloride | $2.3 \times 10^{-14}$ | $2.3 \times 10^{-14}$ | $1.8 \times 10^{-3}$ | 6B | Δ |
|   | PVC |  | $6.7 \times 10^{-13}$ | $6.7 \times 10^{-13}$ | $7.5 \times 10^{-2}$ | 2H | O |
| 4 | Gc | modified | $0.51 \times 10^{-14}$ | $0.53 \times 10^{-14}$ | $0.50 \times 10^{-3}$ | 4H | O |
|   | Gm | alkyd | $1.1 \times 10^{-14}$ | $1.2 \times 10^{-14}$ | $0.95 \times 10^{-3}$ | 6B | X |
|   | PC |  | $5.2 \times 10^{-12}$ | $5.5 \times 10^{-12}$ | $1.4 \times 10^{-1}$ | 2H | O |
| 5 | Hc | acrylic | $1.0 \times 10^{-14}$ | $1.0 \times 10^{-14}$ | $0.89 \times 10^{-3}$ | 3H | O |
|   | Hm | copolymer | $1.9 \times 10^{-14}$ | $1.9 \times 10^{-14}$ | $1.6 \times 10^{-3}$ | 6B | X |
|   | PMMA |  | $3.2 \times 10^{-12}$ | $3.6 \times 10^{-12}$ | $1.0 \times 10^{-1}$ | 2H | O |
| 6 | Jc | polyvinyl | $3.1 \times 10^{-14}$ | $3.2 \times 10^{-14}$ | $1.2 \times 10^{-3}$ | 2H | O |
|   | Jm | chloride | $6.1 \times 10^{-14}$ | $6.1 \times 10^{-14}$ | $2.3 \times 10^{-3}$ | 5B | Δ |
|   | ABS |  | $3.2 \times 10^{-11}$ | $3.3 \times 10^{-11}$ | $1.8 \times 10^{-1}$ | HB | O |
| 7 | Lc | vinyl | $0.95 \times 10^{-14}$ | $0.97 \times 10^{-14}$ | $0.57 \times 10^{-3}$ | 2H | O |
|   | Lm | chloride | $1.8 \times 10^{-14}$ | $1.8 \times 10^{-14}$ | $1.0 \times 10^{-3}$ | 6B | X |
|   | PS | copolymer | $2.5 \times 10^{-11}$ | $2.7 \times 10^{-11}$ | $1.5 \times 10^{-1}$ | HB | O |
| 8 | Nc | vinyl | $0.74 \times 10^{-14}$ | $0.76 \times 10^{-14}$ | $0.49 \times 10^{-3}$ | 2H | O |
|   | Nm | chloride | $1.5 \times 10^{-14}$ | $1.5 \times 10^{-14}$ | $0.96 \times 10^{-3}$ | 6B | X |
|   | 10PET | copolymer | $2.5 \times 10^{-13}$ | $2.6 \times 10^{-13}$ | $7.8 \times 10^{-2}$ | 2H | O |
| 9 | Pc | ionomer | $0.77 \times 10^{-14}$ | $0.78 \times 10^{-14}$ | $0.48 \times 10^{-3}$ | 3H | Δ |
|   | Pm |  | $2.6 \times 10^{-14}$ | $2.6 \times 10^{-14}$ | $1.1 \times 10^{-3}$ | 6B | X |
|   | 20PET |  | $2.3 \times 10^{-13}$ | $2.5 \times 10^{-13}$ | $7.6 \times 10^{-2}$ | 2H | Δ |
| 10 | Rc | acryloni- | $0.72 \times 10^{-14}$ | $0.72 \times 10^{-13}$ | $0.46 \times 10^{-3}$ | 2H | Δ |
|   | Rm | trile | $2.1 \times 10^{-14}$ | $2.1 \times 10^{-14}$ | $0.99 \times 10^{-3}$ | 6B | X |
|   | 20PET | copolymer | $2.3 \times 10^{-13}$ | $2.4 \times 10^{-13}$ | $7.6 \times 10^{-2}$ | 2H | Δ |

EXAMPLE 11

An angular, wide-mouthed container (wide-mouth cup) having a length of 9.7 cm, a width of 9.7 cm, a height of 3.2 cm and an average thickness of 0.47 mm was molded from an isotactic polypropylene sheet having a width of 30 cm and a thickness of 0.8 mm at a temperature of 148° C. according to the plug-assist air-pressure forming method.

The inner surface of the wide-mouthed cup was coated with the anchoring agent described in Example 1 and the cup was heat-treated at 100° C. for 30 seconds. Then, the cup was coated with the polyvinylidene chloride resin type latex described in Example 8 according to the dip coating method and dried in an air-circulated oven maintained at 140° C. for 30 seconds. The average thickness of the polyvinylidene chloride type resin coating layer formed on the inner surface of the isotactic polypropylene cup was 10μ.

For formation of a protecting layer, the same ionomer latex as described in Example 9 was coated as the film-forming resin on the inner surface of the vinylidene chloride copolymer layer according to the dip coating method, and the coated cup was dried at 90° C. for 5 minutes in a perfect oven (explosion-proof type). The average thickness of the protecting layer was 600μ. The cup having the protecting layer is designated as "cup Yc". The comparative cup free of the protecting layer is designated as "cup Ym" and the starting uncoated cup is designated as "cup PP-C".

EXAMPLE 12

The polyvinylidene chloride type resin latex described in Example 8 was brush-coated 4 times on one surface of a polyethylene terephthalate sheet having a width of 30 cm and a thickness of 1.5 mm, and the coated sheet was dried at 70° C. for 20 minutes in an air-circulated oven. The average thickness of the polyvinylidene chloride type resin coating was 28μ.

For formation of a protecting layer, a latex of a styrene butadiene block copolymer having an Izod impact strength (ASTM D-256) of 1.2 Kg/cm² at 5° C. (Dow Latex 529K supplied by Dow Chemical; solid concentration=45% by weight: viscosity=15 centipoises) was coated as the film-forming resin on the surface of the vinylidene chloride copolymer layer by the bar coater, and the coated bottle was dried at 70° C. for 10 minutes in a perfect oven (explosion-proof type). The average thickness of the protecting layer was 51μ.

The coated sheet was subjected to plug-assist air-pressure forming at 107° C. so that the coated surface was located on the inner side, to obtain a wide-mouthed cylindrical cup (the inner surface was coated with the protecting layer) having a diameter of 8.5 cm, a height of 10 cm and a total thickness of 0.44 mm (the thickness of the polyvinylidene chloride type resin coating was 7.8μ and the thickness of the coating layer was 15μ). The so-obtained bottle is designated as "cup Zc".

For comparison, a cup free of the protecting layer and having a substrate/coating layer structure, which has a diameter of 8.5 cm, a height of 10 cm and a total thickness of 0.42 mm (the average thickness of the coating layer was 8.0μ), was prepared. This cup is designated as "cup Zm".

Then, the cups Zc and Zm were aged (heat-treated) in a thermostat chamber maintained at 40° C. for 5 days.

The $PO_2$ and $PH_2O$ values, scratch resistance (pencil hardness) and hot water resistance (boiling test) of discs cut from bottoms of the so obtained cups Zc and Zm and the uncoated cup PET-C were determined to obtain the results shown in Table 4.

TABLE 4

| Example No. | Cup Mark | Protecting Layer | $PO_2$[cc · cm/cm² · sec · cmHg] 20° C., 0% RH | $PO_2$[cc · cm/cm² · sec · cmHg] 20° C., 100% RH | $PH_2O$[g · cm/m² · day] (JIS Z-0208) | Scratch Resistance (pencil hardness) | Hot Water Resistance (boiling test) |
|---|---|---|---|---|---|---|---|
| 11 | Yc | ionomer | $0.75 \times 10^{-14}$ | $0.77 \times 10^{-14}$ | $0.54 \times 10^{-3}$ | 3H | O |
|  | Ym |  | $1.6 \times 10^{-14}$ | $1.6 \times 10^{-14}$ | $1.0 \times 10^{-3}$ | 6B | X |
|  | PP-C |  | $4.3 \times 10^{-12}$ | $4.4 \times 10^{-12}$ | $5.2 \times 10^{-3}$ | 5B | O |
| 12 | Zc | styrene type | $0.73 \times 10^{-14}$ | $0.74 \times 10^{-14}$ | $0.48 \times 10^{-3}$ | 2H | O |
|  | Zm | block polymer | $2.8 \times 10^{-14}$ | $2.8 \times 10^{-14}$ | $1.2 \times 10^{-3}$ | 6B | X |
|  | PET-C |  | $2.4 \times 10^{-12}$ | $2.4 \times 10^{-12}$ | $7.7 \times 10^{-2}$ | 2H | O |

EXAMPLE 13

A preform of polyvinyl chloride ($\bar{P}$=800; 3 parts of MBS) having a length of 150 mm, an outer diameter of 25 mm and a thickness of 1.5 mm was formed by injection molding and was dipped in a solution of a copolymer latex comprising 90% of vinylidene chloride, 5% of methoxyethyl methyl methacrylate, 3% of acrylonitrile and 2% of methacrylate (solid content=55%; viscosity=150 centipoises; particle size=0.2μ), which was maintained at 30° C. The preform was then dried with hot air maintained at 90° C. Then, the temperature was adjusted to 50° to 55° C. for formation of an outer resin layer and the above-mentioned PVC was injected on the outer coating layer of the preform by an outer layer-forming injection molding machine. The coated preform was heated at 105° C. and drawn at a draw ratio of 1.3 by a drawing rod. Then, the preform was blow-molded to obtain a biaxially drawn, multi-layer container having an inner volume of 500 cc.

The average thickness of the inner, intermediate and outer layers were 320μ, 8μ and 310μ, respectively, and the orientation coefficients l and m of the inner layer were 0.25 and 0.41, respectively. The orientation coefficients l and m of the outer layer were 0.29 and 0.46, respectively.

The oxygen permeability of the obtained container was 2.5 cc/day.atm as measured at 37° C., and the interlaminar adhesion strength was 2.5 Kg/15 mm. The peel strength after falling was repeated 10 times was 2.0 Kg/15 mm. The transparency was 3.5% as the haze value. The surface of the container was hardly scratched and the appearance and preserving characteristic were good. A comparative container free of the vinylidene chloride copolymer intermediate layer, which had the same thickness as described above, had an oxygen permeability of 35 cc/day.atm as measured at 37° C. and the interlaminar adhesion strength was 0.8 Kg/15 mm. After falling was repeated 10 times, the peel strength of the comparative container was 0.4 Kg/5 mm.

What we claim is:

1. A laminated plastic container in the form of a bottle, the wall of which comprises a substrate formed of a melt-moldable plastic material, a coating layer formed on at least one surface of the substrate, said coating layer being composed of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers, said copolymer having an oxygen permeation coefficient of less than $9 \times 10^{-14}$ cc.cm/cm².sec.cmHg as measured at a temperature of 20° C. and a relative humidity of 100% and a water vapor permeability coefficient of less than $3 \times 10^{-3}$ g.cm/m².day as determined according to the method of JIS Z-0208, and a protecting surface layer of a film-forming synthetic resin other than a vinylidene chloride resin having an Izod impact strength of at least 1.1 kg/cm² as measured at 5° C. according to the method of ASTM D-256, said protecting surface layer being formed by coating an aqueous latex or organic solvent solution of the synthetic resin on the surface of the coating layer of the vinylidene chloride copolymer, the weight per unit inner volume of said substrate being in the range of from 0.001 to 5 g/ml, said coating layer of the vinylidene chloride copolymer having a thickness of 1 to 30μ; and said protecting surface layer having a thickness of 3 to 700μ.

2. A container as set forth in claim 1, wherein the substrate is a plastic substrate molded in the form of a bottle in advance.

3. A container as set forth in claim 1, wherein the container is formed by subjecting a laminated parison or preform comprising said substrate, said coating layer and said protecting surface layer to biaxial draw-blow molding or deep draw forming.

4. A container as set forth in claim 1, wherein the substrate is composed of an orientable plastic material and is biaxially molecule-oriented.

5. A container as set forth in claim 1, wherein said copolymer is formed from 96 to 75% by weight of vinylidene chloride and 4 to 25% by weight of at least one acrylic or methacrylic monomer and, optionally, further including up to 50 parts by weight of at least one other ethylenically unsaturated monomer per 100 parts by weight of the total amount of said first-mentioned monomers.

6. A container as set forth in claim 1, wherein said acrylic or methacrylic monomer is a monomer represented by the following formula:

wherein $R_1$ stands for a hydrogen atom, a halogen atom or a methyl group, and X stands for a nitrile group ($-C \equiv N$) or a group in which Y stands for an amino group, a hydroxyl group, alkyloxy group, a cycloalkyloxy group, an aminoalkyloxy group, a hydroxyalkyloxy group, an alkoxyalkyloxy group, a haloalkyloxy group, a glycidyl group, an aryloxy group or an aralkyloxy group.

7. A container as set forth in claim 1, wherein said copolymer further includes a monomer represented by the following formula:

wherein $R_1$ stands for a hydrogen atom, a halogen atom or a methyl group, and $R_2$ and $R_3$ each stand for a hydroxyl group and these two hydroxyl groups may be dehydrated to form an oxirane ring.

8. A container as set forth in claim 1, wherein said copolymer is a vinylidene chloride/alkoxyalkyl acrylate or methacrylate/alkyl acrylate or methacrylate/trichloroethylene copolymer.

9. A container as set forth in claim 1 wherein the protecting surface layer is composed of a vinyl chloride homopolymer or copolymer, an acrylic resin, an ionomer, a styrene resin, a styrene-butadiene copolymer, and acrylonitrile-butadiene copolymer or a methylmethacrylate-butadiene copolymer.

10. A container as set forth in claim 1, wherein the plastic substrate is composed of polyethylene terephthalate, polyvinyl chloride, polycarbonate, polyethylene, polystyrene or polypropylene.

11. A container as set forth in claim 1, wherein the protecting surface layer is composed of a vinyl chloride homopolymer or copolymer, an acrylic resin or an ionomer.

12. A container as set forth in claim 1, which is in the form of a bottle having a narrow mouth.

13. A container as set forth in claim 1, which is in the form of a bottle having a wide mouth.

14. A process for the preparation of laminated plastic containers, which comprises coating an aqueous latex or organic solvent solution of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers on at least one surface of a plastic vessel formed by melt molding of a thermoplastic resin, drying the formed coating layer, which has a thickness of 1 to 30μ coating an aqueous latex or organic solvent solution of a film-forming synthetic resin other than a vinylidene chloride resin on the surface of the coating layer of the vinylidene chloride copolymer, and drying the so formed coating layer which has a thickness of 3 to 700μ.

15. A process for the preparation of laminated plastic containers, which comprises coating an aqueous latex or organic solvent solution of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers on at least one surface of a plastic vessel parison, preform or sheet formed by melt molding of a thermoplastic resin, drying the formed coating layer which has a thickness of 1 to 30μ, coating an aqueous latex or organic solvent solution of a film-forming synthetic resin other than a layer of the vinylidene chloride copolymer, drying the so formed coating layer which has a thickness of 3 to 700μ, and subjecting the formed laminate structure to biaxial draw-blow molding or deep draw forming.

16. A process for the preparation of laminated plastic containers, which comprises coating an aqueous latex or organic solvent solution of a copolymer consisting essentially of 99 to 70% by weight of vinylidene chloride and 1 to 30% by weight of at least one acrylic or methacrylic monomer and further including up to 100 parts by weight of at least one member selected from other ethylenically unsaturated monomers per 100 parts by weight of the total amount of said two monomers on at least one surface of a preform composed of a heat-moldable, orientable thermoplastic polymer, injecting or extruding a heat-moldable, orientable thermoplastic polymer on the coated surface of the preform to form a multi-layer parison, and drawing the multi-layer parison in the axial direction under such temperature conditions that molecular oriention is caused in at least one of the thermoplastic polymer on the inner surface side and the thermoplastic polymer on the outer surface side, while drawing the multi-layer parison in the circumferential direction by blowing the thickness of the copolymer layer being 1 to 30μ and that of the heat-moldable orientable thermoplastic polymer layer being 3 to 700μ.

* * * * *